United States Patent [19]
Yeoman et al.

[11] Patent Number: 5,632,933
[45] Date of Patent: May 27, 1997

[54] METHOD AND APPARATUS USING GUIDE VANES FOR VAPOR DISTRIBUTION IN MASS TRANSFER AND HEAT EXCHANGE COLUMNS

[75] Inventors: Neil Yeoman, Nassau, N.Y.; Chang-Li Hsieh, Carlisle, Mass.; Andrew M. Marcinkowski, Derry, N.H.; O. Jeffrey Berven, Wichita, Kans.

[73] Assignee: Koch Engineering Company, Inc., Wichita, Kans.

[21] Appl. No.: 599,795

[22] Filed: Feb. 12, 1996

Related U.S. Application Data

[63] Continuation-in-part of Ser. No. 195,533, Feb. 14, 1994, Pat. No. 5,516,465, which is a continuation-in-part of Ser. No. 101,924, Aug. 4, 1993, abandoned.

[51] Int. Cl.⁶ ........................................................ B01F 3/04
[52] U.S. Cl. ............................ 261/109; 261/79.2; 261/96
[58] Field of Search ............................... 261/79.2, 96, 109

[56] References Cited

U.S. PATENT DOCUMENTS

| | | |
|---|---|---|
| 2,560,071 | 7/1951 | Bloomer . |
| 2,582,826 | 1/1952 | Glitsch . |
| 2,596,106 | 5/1952 | Schneible . |
| 2,611,596 | 9/1952 | Glitsch . |
| 2,649,291 | 5/1953 | Bartolucci . |
| 3,008,553 | 11/1961 | Glitsch et al. . |
| 3,013,782 | 12/1961 | Glitsch . |
| 3,019,003 | 1/1962 | Glitsch . |
| 3,037,754 | 6/1962 | Glitsch . |
| 3,079,134 | 2/1963 | Winn . |
| 3,080,155 | 3/1963 | Glitsch et al. . |
| 3,087,711 | 4/1963 | Glitsch . |
| 3,217,469 | 11/1965 | Eckert . |
| 3,233,708 | 2/1966 | Glitsch . |
| 3,343,821 | 9/1967 | Winn et al. . |
| 3,348,364 | 10/1967 | Henby . |
| 3,448,038 | 6/1969 | Pall et al. . |
| 3,637,195 | 1/1972 | Blazer et al. . |
| 3,959,419 | 5/1976 | Kitterman . |
| 3,969,447 | 7/1976 | Glitsch et al. . |
| 4,008,056 | 2/1977 | Potter . |
| 4,086,307 | 4/1978 | Glaspie . |
| 4,120,919 | 10/1978 | McClain . |
| 4,123,008 | 10/1978 | McClain . |
| 4,198,002 | 4/1980 | McClain . |
| 4,333,894 | 6/1982 | Hoppe et al. . |
| 4,398,827 | 8/1983 | Dietrich . |
| 4,424,069 | 1/1984 | Chang . |
| 4,597,916 | 7/1986 | Chen . |
| 4,604,247 | 8/1986 | Chen et al. . |
| 4,729,857 | 3/1988 | Lee et al. . |
| 4,782,857 | 11/1988 | Bieri . |
| 4,810,428 | 3/1989 | Aly et al. . |
| 4,842,778 | 6/1989 | Chen et al. . |
| 4,909,967 | 3/1990 | Binkley et al. . |
| 4,950,430 | 8/1990 | Chen et al. . |
| 4,956,127 | 9/1990 | Binkley et al. . |
| 5,106,544 | 4/1992 | Lee et al. . |
| 5,156,659 | 10/1992 | Wright . |
| 5,338,447 | 8/1994 | Vellinga . |

FOREIGN PATENT DOCUMENTS

| | | |
|---|---|---|
| 0231841 | 8/1987 | European Pat. Off. . |
| 01156341 | 5/1958 | France . |
| 1481836 | 3/1967 | France . |
| 600807 | 8/1934 | Germany . |
| 764103 | 9/1952 | Germany . |
| 9201637 | 2/1992 | WIPO . |

*Primary Examiner*—Tim R. Miles
*Attorney, Agent, or Firm*—Shook, Hardy & Bacon L.L.P.

[57] ABSTRACT

A mass transfer or heat exchange column is provided with a vapor distributor having, in one embodiment, a deflecting surface which directs a vapor stream about the inner periphery of the column. Following discharge from the distributor, the vapor stream contacts circumferentially spaced guide vanes which redirect the vapor stream toward the center of the column to cause a more uniform distribution of the vapor stream across the horizontal cross section of the column.

24 Claims, 5 Drawing Sheets

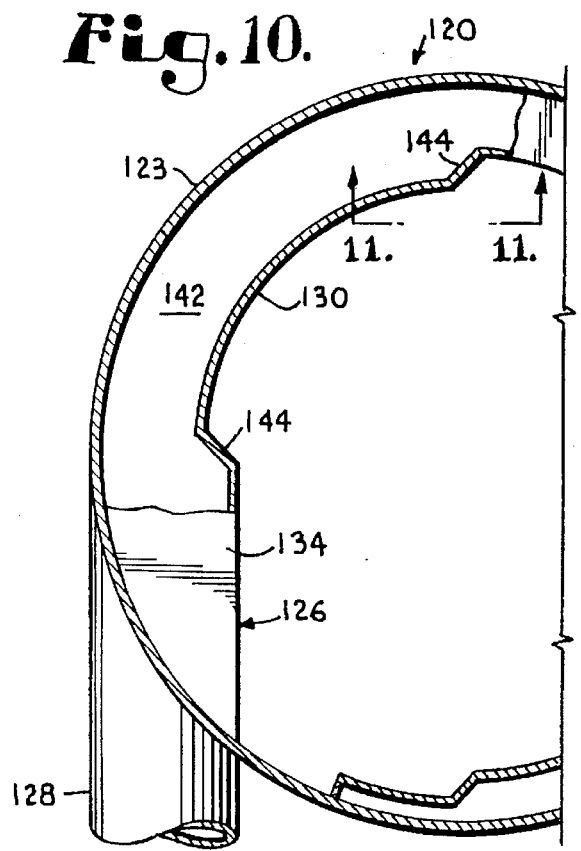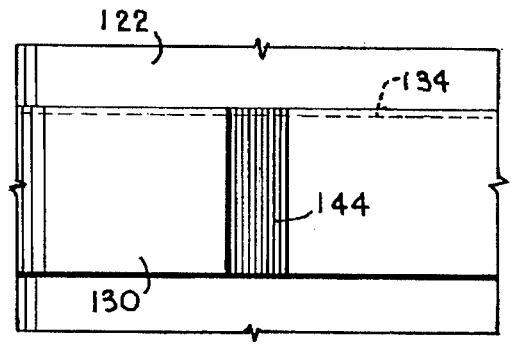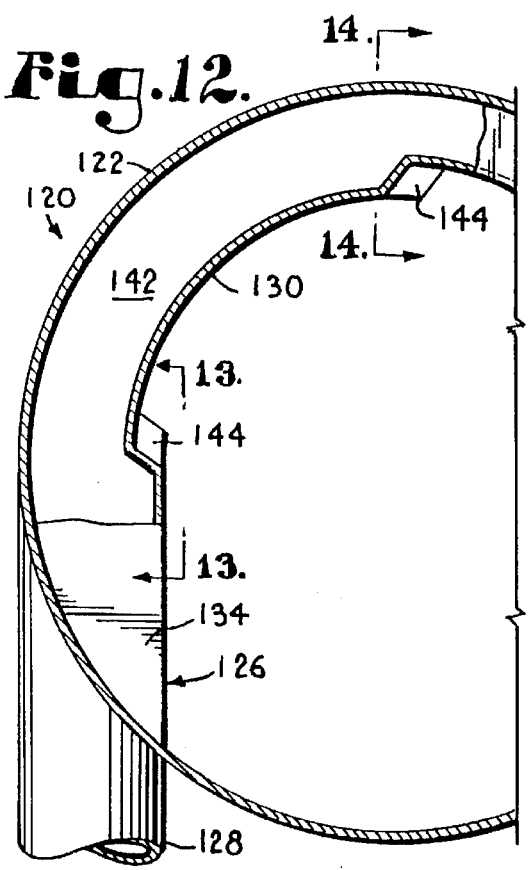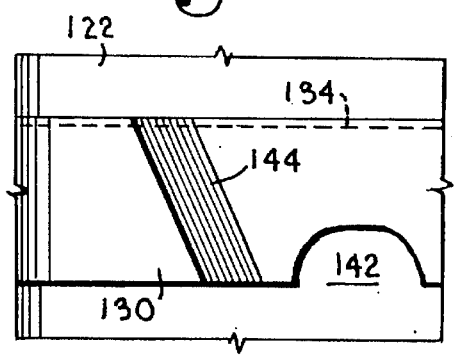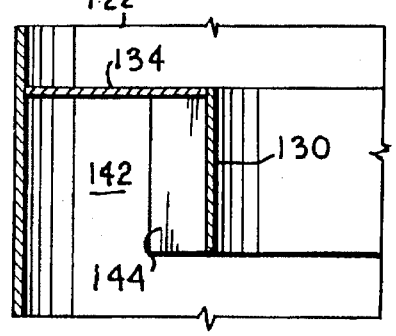

METHOD AND APPARATUS USING GUIDE VANES FOR VAPOR DISTRIBUTION IN MASS TRANSFER AND HEAT EXCHANGE COLUMNS

This is a continuation-in-part of application Ser. No. 08/195,533, filed Feb. 14, 1994, now U.S. Pat. No. 5,516,465, which is a continuation-in-part of application Ser. No. 08/101,924, filed Aug. 4, 1993, now abandoned.

BACKGROUND OF THE INVENTION

This invention relates in general to mass transfer and heat exchange columns and, more particularly, to a method and apparatus to improve vapor distribution in such columns.

Vapor and liquid interaction is required in many types of mass transfer and heat exchange processes. Typically, the vapor stream is introduced to a column below a region containing trays or a random or structured packing while the liquid stream is introduced into the column above the trays or packing. The vapor and liquid streams then flow in countercurrent relation through the region, with the tray or packing serving to distribute the downwardly flowing liquid stream over a larger surface area to enhance the interaction with the upwardly flowing vapor stream.

In order to increase the efficiency of the mass transfer or heat exchange taking place between the vapor and liquid streams, it is important that the vapor be uniformly distributed across the horizontal cross-section of the column, particularly at the lower vapor-liquid interface where the vapor enters the packing. When the vapor is introduced to the column below the packing, the velocity of the vapor can prevent the desired horizontal distribution of the vapor prior to its entry into the packing. In order to improve the vapor distribution, deflectors have been positioned in some columns in the flow path of the vapor to deflect the vapor in a plurality of directions. One example of such a deflector is a V-shaped deflector which is positioned at the vapor inlet to split the vapor stream into two streams flowing in opposite directions. This deflector is of a simple design and performs adequately in many installations that tolerate some maldistribution of the vapor stream.

Another example of a conventional vapor distributor known as a vapor horn is disclosed in U.S. Pat. No. 5,106,544. The vapor horn disclosed in that patent comprises an annular housing which is open at the bottom. The vapor horn contains a plurality of vanes which extend upwardly at progressively greater distances into the housing through the open bottom for causing downward deflection of the circumferentially flowing vapor stream. The downwardly deflected vapor is then said to rise in a uniform manner into a packing bed which is positioned radially inwardly from the vapor horn.

While conventional vapor distributors can function satisfactorily in many applications, a need has arisen for an improved vapor distributor which will provide a more uniform distribution of vapor across the horizontal cross-section of a mass transfer or heat exchange column.

SUMMARY OF THE INVENTION

It is a primary object of this invention to provide a vapor distributor which is effective to increase the horizontal distribution of vapor entering a mass transfer or heat exchange column so that enhanced vapor and liquid interaction in the column can be achieved.

It is another object of this invention to provide a vapor distributor which is of simple design so that it may be easily installed in a column and yet provides uniform horizontal distribution of vapor entering the column.

To accomplish these and other related objects, in one aspect the invention is directed to a mass transfer or heat exchange column comprising: a shell presenting an open internal volume and having a generally vertical center axis; a vapor inlet nozzle extending through said shell for directing a vapor stream into said open internal volume in a generally radial direction; a distributor within said shell and comprising a generally upright deflecting surface spaced radially inwardly from the vapor inlet nozzle and top and bottom plates extending between the deflecting surface and the shell to substantially close the top and bottom of the distributor, said deflecting surface being shaped and positioned in relation to said vapor inlet nozzle to divide and redirect the vapor stream from said generally radial direction to oppositely directed flow paths about an inner periphery of the column shell; and guide vanes within said shell and positioned in said vapor stream flow paths in spaced relationship from the distributor to redirect at least a portion of said vapor stream toward said center axis from said flow paths about the inner periphery of the column shell to cause a more uniform distribution of the vapor stream across a horizontal cross section of the column.

In another aspect, the invention is directed to a method for distributing a vapor stream within a mass transfer or heat exchange column having an external shell and a vapor inlet nozzle extending through said shell, said method comprising the steps of providing a distributor within the external shell of said column, said distributor comprising a generally upright deflecting surface spaced radially inwardly from the vapor inlet nozzle and top and bottom plates extending between the deflecting surface and the shell to substantially close the top and bottom of the distributor; introducing the vapor stream into the distributor through the vapor inlet nozzle and directing the vapor stream against the deflecting surface to divide and redirect the vapor stream to oppositely directed flow paths about an inner periphery of the column shell as it is discharged from the distributor; and then contacting the vapor stream against guide vanes spaced from the distributor in said oppositely directed flow paths to redirect at least a portion of said vapor stream toward said center axis from said flow paths to cause a more uniform distribution of the vapor stream across a horizontal cross section of the column.

BRIEF DESCRIPTION OF THE DRAWINGS

In the accompanying drawings which form a part of the specification and are to be read in conjunction therewith and in which like reference numerals are used to indicate like parts in the various views:

FIG. 10 is a fragmentary top plan view of a further embodiment of a vapor distributor with portions broken away to illustrate details of construction;

FIG. 11 is a fragmentary side elevation view of the vapor distributor shown in FIG. 10 and taken along line 11—11 of FIG. 10 in the direction of the arrows;

FIG. 12 is a fragmentary top plan view of a still further embodiment of a vapor distributor of the present invention, portions being broken away to shown the open bottom of the distributor;

FIG. 13 is a fragmentary side elevation view of the vapor distributor shown in FIG. 12 and taken in vertical section along line 13—13 of FIG. 12 in the direction of the arrows;

FIG. 14 is a fragmentary elevation view of the vapor distributor shown in FIG. 12 and taken in vertical section along line 14—14 of FIG. 12 in the direction of the arrows;

DESCRIPTION OF THE PREFERRED EMBODIMENTS

Figure 1:
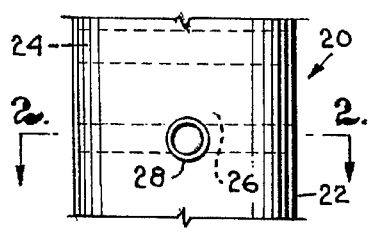
FIG. 1 is a fragmentary side elevation view of a column in accordance with the present invention showing a vapor inlet nozzle and a vapor distributor and a packing zone which are illustrated by broken lines.
Figure 2:
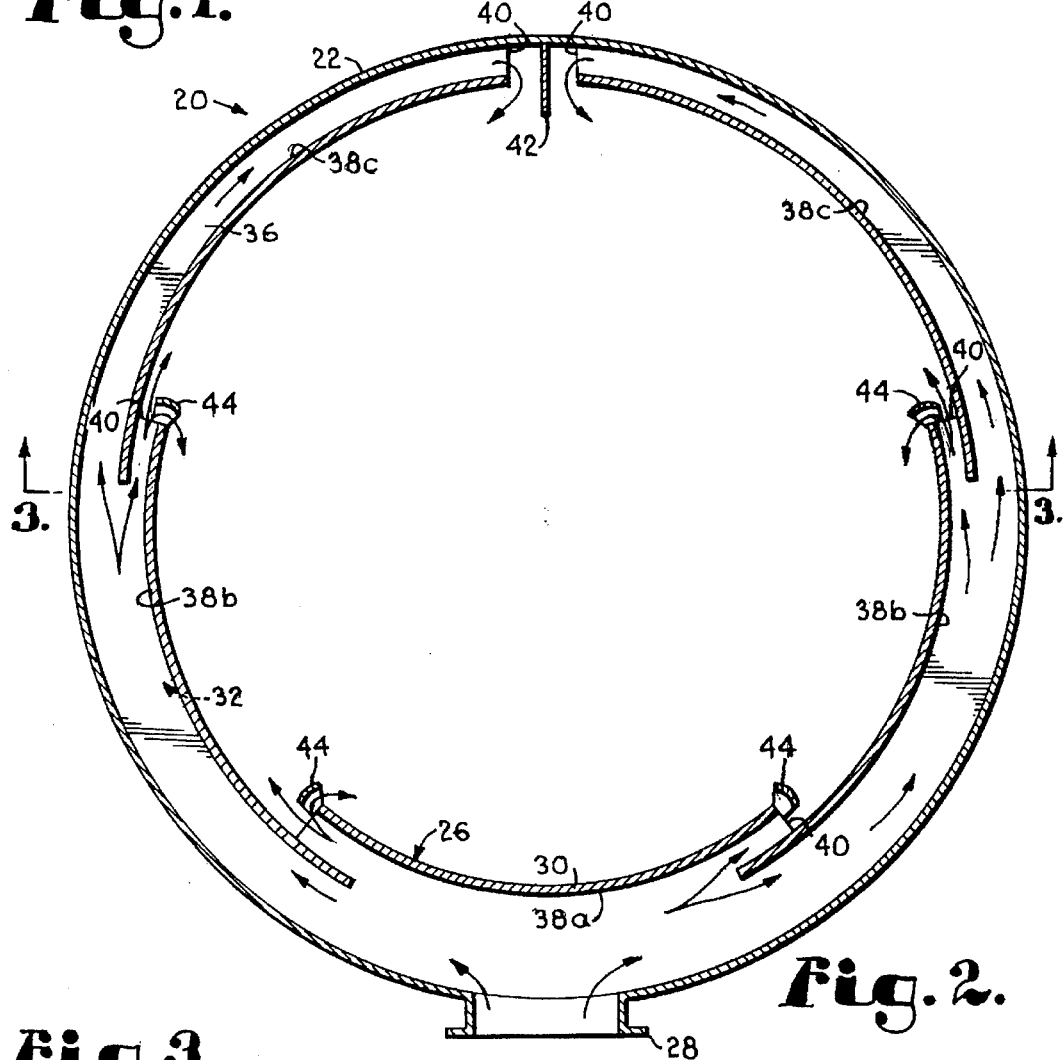
FIG. 2 is an enlarged top plan view of the column and vapor distributor taken in horizontal section along line 2—2 of FIG. 1 in the direction of the arrows, the direction of flow of the vapor through the distributor being illustrated by arrows.
Figure 3:
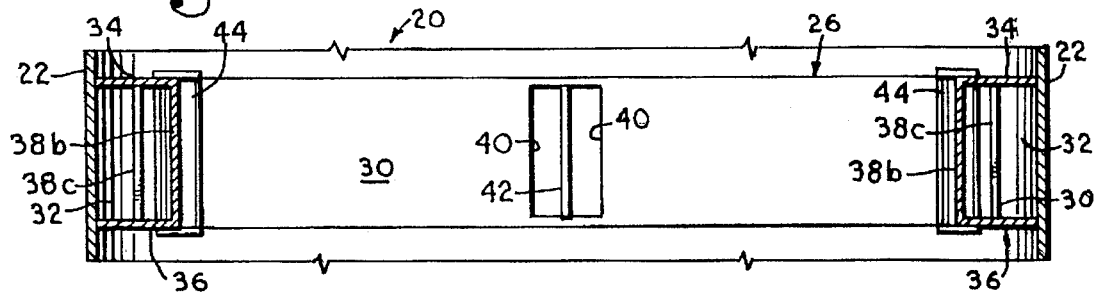
FIG. 3 is a side elevation view of the column and vapor distributor taken in vertical section along line 3—3 of FIG. 2 in the direction of the arrows.

Turning now to the drawings in greater detail, and initially to FIGS. 1–3, a column constructed according to a first embodiment of the present invention is represented by the numeral 20. Column 20 comprises a rigid exterior shell 22 which is of cylindrical construction and presents an open internal volume through which fluid streams may flow. The column shell 22 can also be of other desired configurations including those which are of square, rectangular or other polygonal cross section. The column 20 can be a mass transfer and/or heat transfer column, depending upon the types of chemical processing operations which are to be performed within column 20.

Column 20 includes a zone 24 in which trays or packing are positioned to facilitate interaction between liquid and vapor streams flowing through the open internal volume of the column. The packing can be random or structured packing and multiple zones of such packing and/or trays can be provided. It will be appreciated that the column 20 can include reboilers, reflux lines and other components which are necessary or desired for the particular chemical processing being conducted within the column.

The column 20 also includes a vapor horn or distributor 26 constructed in accordance with the present invention to facilitate a more uniform distribution of vapor as it flows upwardly and enters packing zone 24. It will be appreciated that liquid can be and usually is associated with the vapor and the use of the term "vapor" is intended to encompass the presence of liquid. The vapor distributor 26 is positioned in a plane beneath the trays or packing in zone 24 and is in communication with a radial inlet nozzle 28 which extends through the column shell 22 to allow the introduction of vapor into the column 20 in a direction generally perpendicular to the column shell. As can best be seen in FIG. 2, the distributor 26 includes an inner annular wall 30 which is spaced radially inwardly from the column shell 22 in the same general horizontal plane as the inlet nozzle 28. The annular wall 30 and column shell 22 form the sides of an annular plenum 32 which provides a vapor flow path around the inner circumference of the column shell 22.

As is shown in FIG. 3, the plenum 32 is generally rectilinear and is closed at the top by a ring-shaped top plate 34 which extends horizontally between the inner annular wall 30 and the column shell 22. A ring-shaped bottom plate 36 closes the bottom of the plenum 32 and likewise extends between the inner annular wall 30 and column shell 22. The top and bottom plates 34 and 36 are secured to the inner annular wall 30 in a suitable manner such as by welding and can be secured to the inner surface of the column shell 22 in a similar manner. The inner annular wall 30 and plates 34 and 36 can be constructed of various suitable materials which are sufficiently rigid to withstand the pressures exerted by the vapor stream flowing through plenum 32. The material selected should also be compatible with and be resistant to degradation by the vapor and liquid encountered within the column 20.

Returning to FIG. 2, the inner annular wall 30 comprises a plurality of circumferentially extending segments 38a, 38b and 38c which are radially staggered to form outlet ports 40 along the circumference of the annular wall 30. Each outlet port 40 allows a portion of the vapor stream flowing in plenum 32 to be directed through the outlet port 40 and into the open area of column 20 located radially inward from the annular wall 30. The use of a plurality of the outlet ports 40 allows the vapor stream in plenum 32 to be divided into a number of smaller individual streams which are directed from the plenum at spaced apart locations. The division of the vapor stream in this manner allows for turbulent mixing of the vapor streams in the open area, which in turn results in a more uniform distribution of the vapor across the horizontal cross section of the column 20 than could be achieved if the vapor were simply allowed to pass into the column interior directly from the vapor inlet nozzle 28.

The inner annular wall segments 38a, 38b and 38c are generally concentric with the column shell 22 but each segment is radially offset from the adjacent segment so that the width of the plenum 32 becomes progressively more restricted in the direction of flow of the vapor stream. The wall segment 38a is located at the vapor inlet nozzle 28 and serves to divide the vapor stream entering the column 20 through nozzle 28 into two streams flowing circumferentially in opposite directions within plenum 32. The wall segments 38b located adjacent and downstream from the wall segment 38a are spaced radially outward from the wall segment 38a and overlap the ends thereof to form the sides of the outlet ports 40. Similarly, the wall segments 38c overlap the ends of wall segments 38b and are spaced more closely to the column shell 22 than wall segments 38b.

Figure 4:
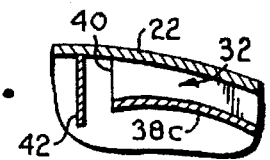
FIG. 4 is a fragmentary top plan view of an end portion of an alternate embodiment of a vapor distributor of the present invention.

At the downstream end of the wall segments 38c, the outlet ports 40 are formed by the spacing between the wall segments 38c and the column shell 22. The downstream end of wall segments 38c and the corresponding outlet ports 40 are located approximately 180° from the vapor inlet nozzle 28, although other locations are possible and may be preferred in some applications. A deflector 42 is mounted to the column shell 22 at a position between the outlet ports 40 at the downstream end of the wall segments 38c so that the vapor discharge from such ports is deflected radially inwardly. Although the deflector 42 is shown as being of planar construction, it will be appreciated that curvilinear surfaces could be provided if desired. In addition, the downstream ends of the wall segments 38c could be flared radially inwardly to increase the cross-sectional area of the associated outlet ports 40 as shown in FIG. 4.

Because the width of the outlet ports 40 corresponds to the radial spacing of wall segments 38a, 38b and 38c, it will be apparent that the quantity of vapor passing through each port 40 can be predetermined by positioning the wall segments at the desired radial locations. Preferably, each port 40 has approximately the same cross-sectional area so that the vapor stream flowing in the plenum 32 is evenly divided among the outlet ports 40 and the velocity of the vapor stream exiting each outlet port 40 is substantially the same. It can be appreciated that splitting the vapor stream in this fashion allows it to enter the open interior volume of the column 20 in a more uniform manner. The number of outlet ports 40 can also be varied from that shown by increasing or decreasing the number of segments of the inner annular wall 30. In general, increasing the number of outlet ports 40 causes a more uniform distribution of the vapor stream within the column interior. The quantity of vapor exiting each port 40 can also be controlled by varying the distance of overlap of the wall segments 38a, 38b and 38c at each port 40.

The outlet ports 40 discharge the multiple vapor streams in a circumferential direction within a common horizontal plane. If desired, a curved deflector 44 can be positioned within a portion of the vapor discharge stream adjacent one or more outlet ports 40 to deflect a portion of the stream in a different flow direction and increase the distribution of the vapor. However, in many applications, sufficient vapor distribution can be achieved without the use of deflectors 44.

It can be readily seen that the vapor distributor 26 serves to distribute the vapor stream entering the column 20. In a process in accordance with the present invention, a vapor stream is introduced into the column 20 through vapor inlet nozzle 28 and enters vapor distributor plenum 32. The vapor stream flows in the plenum 32 around the inner periphery of the column 20 and is split into a plurality of smaller streams which are distributed into the column interior by outlet ports 40. The distributed vapor streams then ascend in the open interior volume of the column 20 and feed into the packing zone 24 positioned above the vapor distributor 26. The vapor entering the packing zone 24 encounters and interacts with a liquid stream which has been introduced into the column at a location above the packing zone 24. Notably, because the vapor entering the packing zone 24 has been uniformly distributed across the horizontal cross-section of column 20, interaction between the vapor and liquid in the packing zone 24 is greatly facilitated, particularly in the lower portions of the packing.

It can be appreciated that other modifications of the vapor distributors previously described can be made and remain within the scope of the invention. As but one example, the ring-shaped bottom plate can be removed from the described embodiments of the vapor distributor. This allows portions of the vapor stream to flow downwardly out of the plenum through the open bottom while other portions flow radially inwardly through the outlet ports in the inner annular wall of the vapor distributor.

Further embodiments of the vapor distributor of the present invention are illustrated in FIGS. 5–14, in which the same reference numerals preceded by the prefix "1" are used to designate components which have been previously described.

Figure 5:
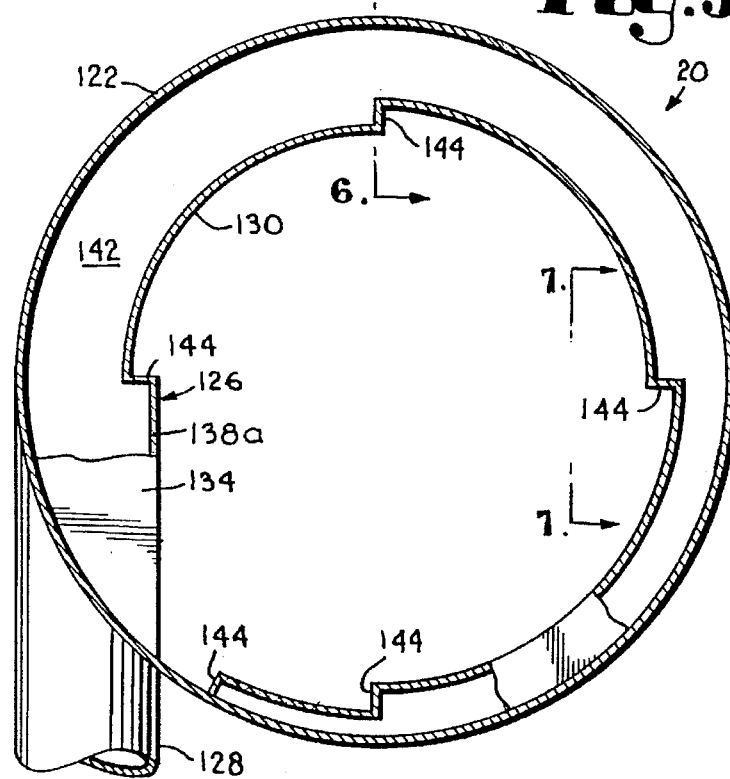
FIG. 5 is a top plan view of another embodiment of a vapor distributor, portions being broken away to illustrate the open bottom of the distributor.

Turning first to FIG. 5, an alternate embodiment of a column constructed in accordance with the present invention is designated by the numeral 120. Column 120 differs from column 20 in one aspect by utilizing a tangential vapor inlet 128 instead of the radial inlet nozzle 28 used with column 20. Because the vapor stream enters the plenum 132 tangentially to the column shell 122, it is not split into two streams flowing in opposite directions, as is the case with column 20. Instead, the plenum 132 carries the vapor stream in only one direction about the inner periphery of the column shell 122.

The plenum 132 in column 120 extends substantially 360° about the inner periphery of the column shell 122. Although the initial inner annular wall segment 138a adjacent the vapor inlet nozzle 128 has been illustrated as being of planar construction, it could alternately be of a curvilinear configuration.

Distributors 126 differ from those previous described in that they have an at least partially open bottom through which all or substantially all of the vapor is discharged. A uniform discharge of the vapor through the open bottom of the distributor 126 is obtained by providing within the distributor a conduit or flow channel 142 having a decreasing cross-sectional area in the direction of vapor flow. As portions of the vapor stream are discharged through the bottom of the distributor 126, the decreasing area of the flow channel 142 serves to maintain the vapor remaining within the flow channel at the desired pressure. By maintaining the desired pressure on the vapor stream in this manner, the quantity of vapor discharged along the annular length of the distributor remains substantially uniform and results in more uniform distribution of the vapor stream across the horizontal cross section of the column 120.

The flow channel 142 can be square, rectilinear, polygonal, round or oval in vertical cross section. As illustrated in FIGS. 5–14, the annular flow channel 142 is rectilinear in cross section and is defined by the top plate 134, inner annular wall 130 and the column shell 122. Although shown with the bottom completely open, it will be appreciated that the flow channel 142 can be partially closed at the bottom if desired.

The decreasing vertical cross section of the flow channel 142 is achieved by placement of the inner annular wall 130 more closely to the column shell 122 in the direction of vapor flow. In each of the embodiments shown in FIGS. 5–14, the inner annular wall 130 is segmented with the segments being concentric with the column shell 122 and placed progressively closer to shell 122 in the direction of vapor flow. The cross-sectional area of the distributor 126 thus decreases in a step-wise manner in the direction of vapor flow. The number of wall segments utilized can vary as desired. Alternatively, the inner annular wall 130 can extend in a continuous curve so that the narrowing of the flow channel 142 is continuous rather than step-wise.

When the inner annular wall 130 is formed by concentric segments as in the distributors shown in FIGS. 5–14, an upright deflector wall 144 is placed at the downstream end of each inner annular wall segment and is connected to the upstream end of the next inner annular wall segment. Another deflector wall 144a is also positioned at the downstream end of the final annular wall segment and is joined to the column shell 122 to close the end of the vapor flow channel 142.

The deflector walls 144 not only form the transition between the inner annular wall 130 segments, but also serve to disrupt and deflect the flow of that portion of the vapor stream traveling in the flow channel 142 adjacent to the inner annular wall 130. The deflection of the vapor stream in this manner causes an increase in the turbulence and the resulting mixing of the entire vapor stream flowing within the flow channel 142. A portion of the deflected vapor stream is also directly funneled out of the open bottom of the distributor 126 by the deflector walls 144. The vapor stream is thus discharged from the distributor 126 by both the increase in flow resistance as it travels through the constricting flow channel 142 and the deflector walls 144 which interrupt the flow of portions of the vapor stream.

Figure 6:
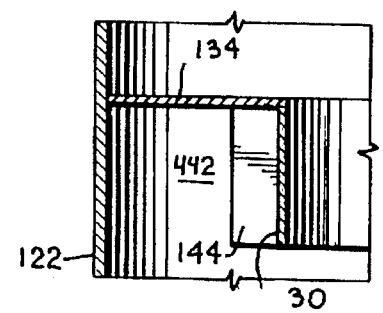
FIG. 6 is a fragmentary elevation view of the vapor distributor shown in FIG. 5 and taken in vertical section along line 6—6 of FIG. 5 in the direction of the arrows.
Figure 7:
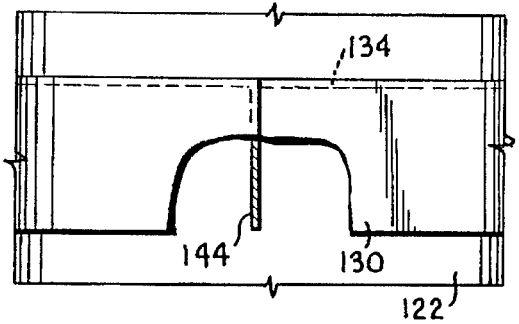
FIG. 7 is a fragmentary side elevation view of the vapor distributor shown in FIG. 5 and taken in vertical section along line 7—7 of FIG. 5 in the direction of the arrows, portions being broken away to show the open bottom of the distributor.

The deflector walls 144 can be oriented in various ways depending upon the particular flow pattern desired. As shown in FIGS. 5–7, each deflector wall 144 can be positioned to lie along a radial line. The radial deflector walls 144 thus extend generally perpendicular to the inner annular wall and parallel to the vertical axis of the column 120.

Figure 9:
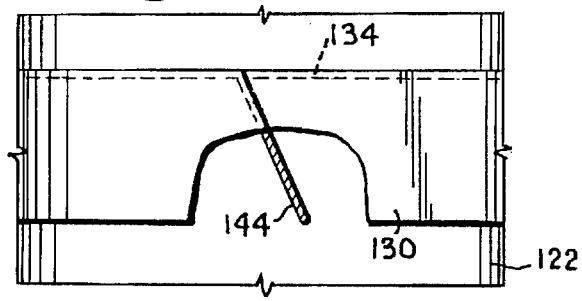
FIG. 9 is a fragmentary side elevation view of the vapor distributor shown in FIG. 8 and taken in vertical section along line 9—9 of FIG. 8 in the direction of the arrows, portions of an inner wall of the distributor being broken away for purposes of illustration.
Figure 8:
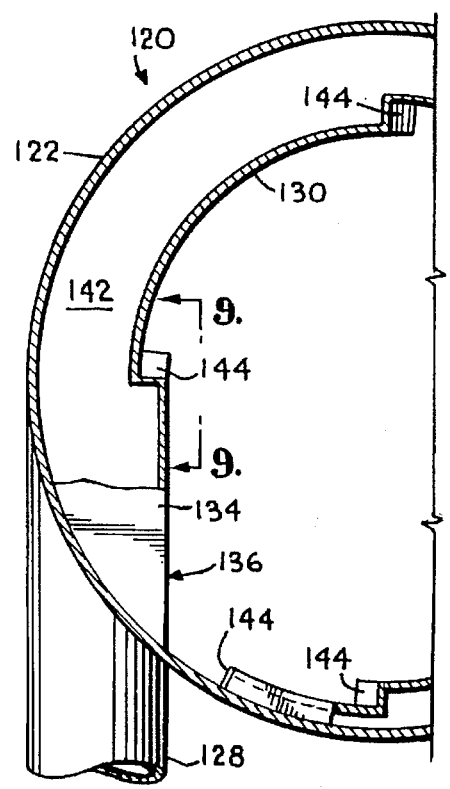
FIG. 8 is a fragmentary top plan view of still another embodiment of a vapor distributor of the present invention, portions being broken away to illustrate details of construction.
Figure 15:
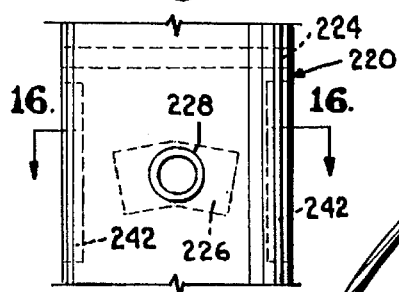
FIG. 15 is a fragmentary side elevation view of a column similar to that shown in FIG. 1 but showing an alternate embodiment of a vapor distributor of the present invention.
Figure 16:
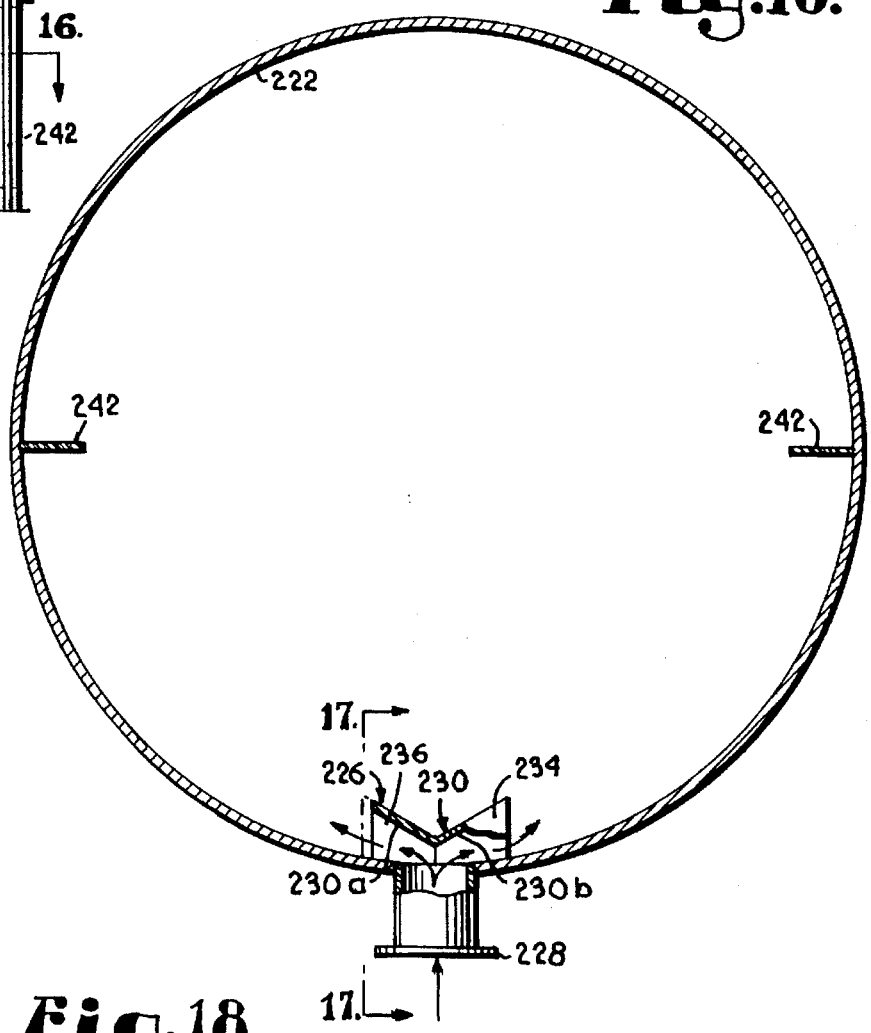
FIG. 16 is an enlarged top plan view of the column shown in FIG. 15 taken in horizontal section along line 16—16 of FIG. 15 in the direction of the arrows, the direction of vapor flow being indicated by arrows.

Alternatively, as shown in FIGS. 8 and 9, the radial deflector walls 144 can be inclined at an angle to the vertical axis of column 120 in the direction of flow of the vapor stream. Inclination of the deflector walls 144 in this manner increases the downward deflection of the vapor stream in comparison to the vertically oriented deflector walls 144 and more efficiently funnels portions of the vapor stream downwardly and out of the bottom of the distributor 126. It will be appreciated that the angle of inclination can vary from that illustrated and remain within the scope of the invention.

Another variation of the orientation of the deflector walls 144 is shown in FIGS. 10 and 11, wherein the deflector walls are vertical but are angled with respect to the radial line or radius of the column 120. The angled deflector walls 144 provide a smoother transition between the inner annular wall 130 segments in comparison to the radial deflector walls and are less disruptive to the flow of the vapor stream. As a result, the vapor stream is preferentially funneled radially outward rather than downwardly.

A still further variation of the orientation of the deflector walls 144 is shown in FIGS. 12–14, with the deflector walls 144 extending at an angle to both the column vertical axis and the radial line. The angled deflector walls 144 thus serve to preferentially funnel portions of the vapor stream downwardly and radially outwardly at the same time.

The distributors 126 shown in FIGS. 5–14 can be operated in a manner similar to the distributors previously described to cause a uniform distribution of a vapor stream entering column 120 through inlet nozzle 128. In order to allow the volumetric flow rate of vapor exiting the open bottom of the distributor 126 to remain substantially uniform along the length of the distributor, the amount by which the area of the flow channel 142 decreases along its length is selected in conjunction with the volumetric vapor flow rates, inlet vapor pressure and temperature, specific gravity of the vapor, and length of the flow channel.

The pressure differential between the vapor flowing in the distributor 126 and in adjacent areas of the column 120 causes portions of the vapor stream to flow out the open bottom of the distributor. By decreasing the area available within the distributor 126 for the flow of the vapor stream as it travels along the flow channel 142, a more controlled pressure differential is maintained along the length of the distributor. This then results in a more uniform discharge of the vapor stream along the annular length of the distributor, with the discharged vapor stream being more uniformly distributed across the horizontal cross section of the column 120 prior to entry into the overlying packing.

Turning now to FIGS. 15–18, where reference numerals with the prefix "2" are used to designate like components previously described, a column 220 is shown which incorporates a distributor 226 which extends about only a minor portion of the inner radius or periphery of a shell 222 of the column 220. The distributor 226 includes a deflecting surface 230 which is positioned radially inwardly at the vapor inlet nozzle 228 so that the radially directed vapor stream entering the column through the nozzle is brought into contact with the deflecting surface. The deflecting surface 230 is shaped and positioned to divide the vapor stream and redirect it in oppositely directed flow paths about the inner periphery of the column shell 222. The deflecting surface 230 is preferably V-shaped when viewed from above to present two generally upright impingement surfaces 230a and 230b that face away from each other and intersect along a vertical line near the nozzle 228. The included angle formed by the intersecting impingement surfaces 230a and 230b can be vary as desired. In general the included angle will range from approximately 30° to 180°, and more preferably from approximately 90° to 150°. Alternatively, deflecting surface 230 can be formed by more than two planar impingement surfaces or an outwardly convex arcuate surface. The deflecting surface 230 may also be inclined downwardly at an angle to the vertical so that the vapor stream is deflected at a downward angle while it is being deflected circumferentially. The angle of deflection can be varied as desired, such as between an angle of 0° and approximately 30°, and more preferably at an angle between approximately 0° and 15°.

The distributor 226 also includes a top plate 234 and a bottom plate 236 which extend between the deflecting surface 230 and the shell 222 to completely or at least substantially close the top and bottom of the distributor. One or both of the top plate 234 and the bottom plate 236 can extend generally horizontally or can be inclined downwardly from a radial mid-line to present opposed downwardly sloping portions in the direction of vapor discharge from the distributor 226. Preferably, both the top and bottom plates are downwardly inclined from the radial mid-line at the same angle, which angle may range from 0° to approximately 30° and more preferably is approximately 10°. The sides of the distributor 226 remain open to permit the discharge of the vapor stream in oppositely directed flow paths about the inner periphery of the column shell 222. In certain applications, the bottom plate 236 and/or the top plate 234 may be omitted. More typically, however, only the bottom plate 236 would be omitted.

The distributor 226 is positioned to cover the inlet nozzle 228 and is sized to extend along a portion of the periphery of the shell 222. The peripheral dimension of the distributor 226 can range from approximately the width of the nozzle 228 opening to slightly less than the circumference of the shell 222. Desirably, the peripheral dimension of the distributor 226 is less than one-half of shell circumference and preferably is less than one-quarter of the circumference.

Figure 18:
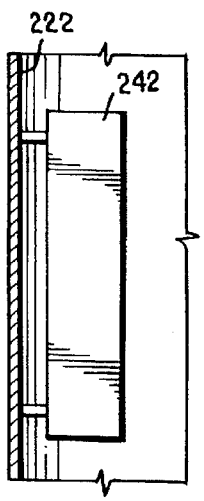
FIG. 18 is a fragmentary, side elevation view of the column taken in vertical section showing an alternate embodiment of a guide vane.
Figure 17:
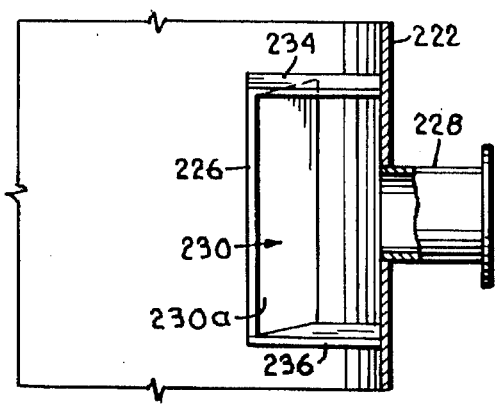
FIG. 17 is a fragmentary side elevation view of the column shown in FIG. 15 taken in vertical section along line 17—17 of FIG. 16 in the direction of the arrows, and showing the deflector positioned in relation to the vapor inlet.

Guide vanes 242 which may be similar to deflector 42 previously described are positioned at locations circumferentially spaced from the distributor 226. The guide vanes 242 are located within the flow path of the vapor stream discharged from the distributor 226 and desirably are of a vertical height such that the top and bottom edges of at least one vane in each flow path lie in horizontal planes above the top and bottom edges, respectively, of the distributor 226. More than one guide vane 242 may also be positioned within each flow path. If a plurality of guide vanes 242 are used, they should be of progressively larger size in a downstream direction. The shape of the guide vanes 242 can also be varied as desired. In the illustrated embodiment, the guide vanes are generally planar and are radially aligned. The guide vanes 242 could also be arcuate or any suitable shape for redirecting the vapor stream toward the central vertical axis of the column. The guide vanes 242 need not be radially aligned but could be tilted or angled much like the deflector walls 144 previously described. In addition, the guide vanes 242 can be positioned against an inner surface of said column shell 222 to block the flow of the vapor stream along said inner periphery of the shell between the guide vanes and inner surface. Alternatively, the guide vanes 242 can be spaced from the inner surface of said shell 222 as shown in FIG. 18 to permit a portion of said vapor stream to flow between the spaced guide vane and the inner surface of the shell 222. It will be appreciated that the width of the guide vanes 242 in the radial direction can be varied as desired.

The circumferential positioning of the guide vanes 242 can be selected as desired for particular applications. Desirably, the guide vanes 242 in the oppositely directed flow paths are positioned equidistance from the distributor 226. It has been found that a uniform distribution of the vapor stream across the horizontal cross section of the column can be achieved by placing the guide vanes 242 at positions 180° opposite from each other and equidistant from the distributor 226. Other suitable placements are possible and are within the scope of the invention.

In operation, distributor 226 functions in a manner similar to distributor 26 previously described except the vapor stream is free to flow a much greater distance about the inner periphery of the shell 222 unconstrained by the distributor 226.

Figure 19:
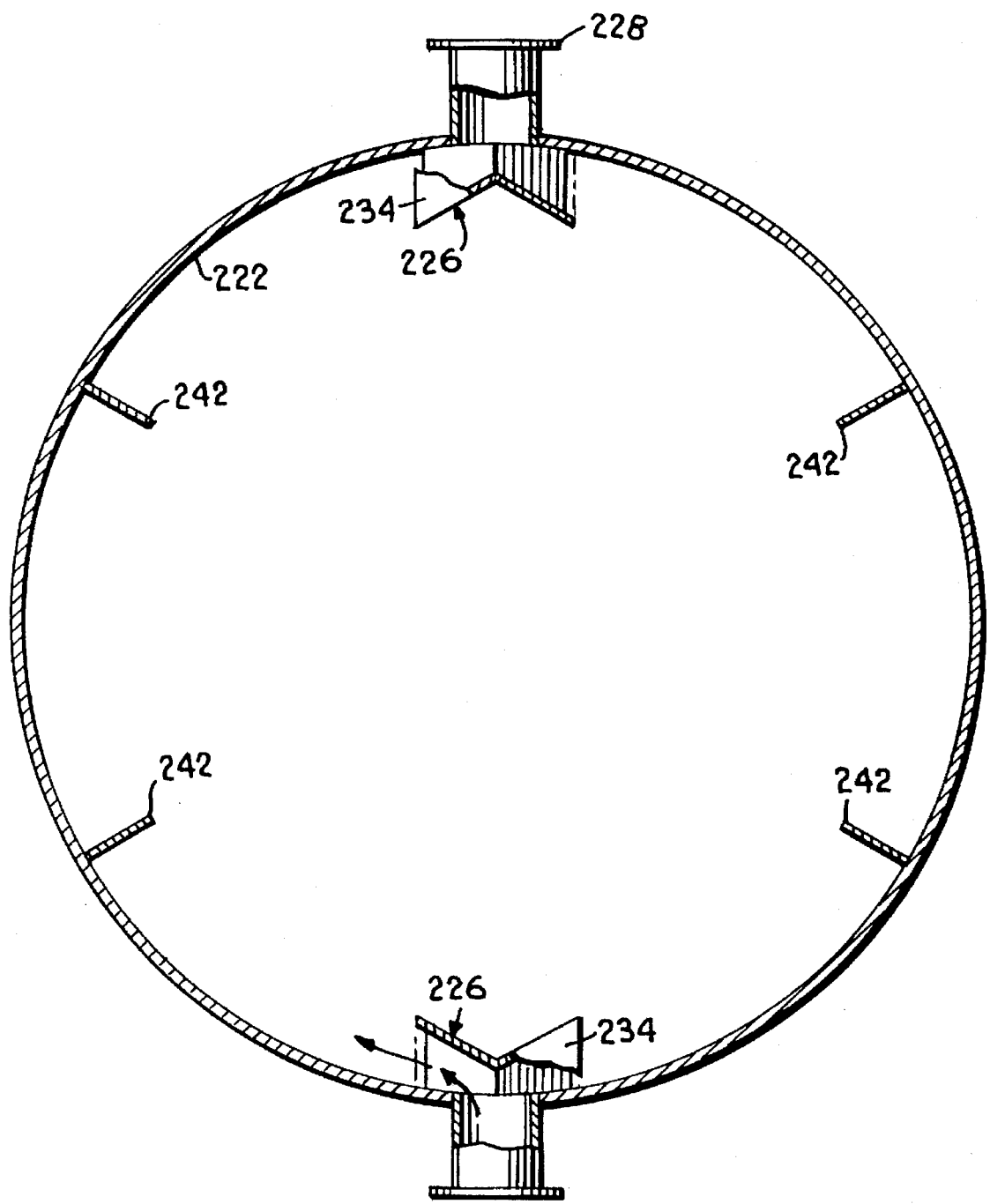
FIG. 19 is a top plan view of a column taken in horizontal section and showing an alternate embodiment of the invention shown in FIG. 15.

It will be appreciated that more than one vapor inlet nozzle 228 may be utilized in the column. Such an arrangement is illustrated in FIG. 19 where two inlet nozzles 228 and two associated distributors 226 are illustrated. The inlet nozzles 228 are positioned directly opposite from each other but they may be placed closer together if desired. One or more guide vanes 242 are positioned intermediate the opposed distributors 226 to deflect the circumferential vapor streams toward the vertical center axis of the column. In the illustrated embodiment, two guide vanes 242 are positioned along the shell 222 in both circumferential directions and are spaced equidistance from each other and the adjacent distributor 226. This spacing, as well as the number of guide vanes 242, can be varied as desired.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A mass transfer or heat exchange column comprising:

a shell presenting an open internal volume and having a generally vertical center axis;

a vapor inlet nozzle extending through said shell for directing a vapor stream into said open internal volume in a generally radial direction;

a distributor comprising a generally upright deflecting surface within said shell and spaced radially inwardly from said vapor inlet nozzle for redirecting the vapor stream from said generally radial direction to a flow path directed about an inner periphery of the column shell, said distributor extending along less than about one-half of an inner circumference of the shell and including a top plate extending between the deflecting surface and the shell to substantially block upward deflection of the vapor stream; and a guide vane extending inwardly from said shell and circumferentially spaced from the distributor, said guide vane being positioned in said vapor stream flow path to redirect at least a portion of said vapor stream toward said center axis from said flow path about the inner periphery of the column shell to cause a more uniform distribution of the vapor stream across a horizontal cross section of the column.

2. The column as set forth in claim 1, wherein said distributor extends along less than about one-quarter of the inner circumference of the shell.

3. The column as set forth in claim 1, wherein said deflecting surface divides and redirects said vapor stream into two oppositely directed flow paths about the inner periphery of the column shell.

4. The column as set forth in claim 3, including a second guide vane extending inwardly from the shell in circumferentially spaced relationship from the distributor, one of said guide vanes being positioned in each of said oppositely directed flow paths to redirect said vapor stream toward said center axis from said oppositely directed flow paths about the inner periphery of the column shell to cause said more uniform distribution of the vapor stream across the horizontal cross section of the column.

5. The column as set forth in claim 4, including more than one guide vane within each of said oppositely directed flow paths.

6. The column as set forth in claim 4, wherein said first mentioned guide vane and said second guide vane are positioned at approximately equal distances from said distributor.

7. The column as set forth in claim 4, wherein said guide vanes are generally curved.

8. The column as set forth in claim 4, wherein said guide vanes have a height greater than a corresponding dimension of the deflecting surface.

9. The column as set forth in claim 8, wherein at least one of said guide vanes is spaced from an inner surface of said shell to permit a portion of said vapor stream to flow between the spaced guide vane and the inner surface.

10. The column as set forth in claim 4, wherein said guide vanes are generally planar.

11. The column as set forth in claim 10, wherein said guides vanes are radially aligned.

12. A mass transfer or heat exchange column comprising:

a shell presenting an open internal volume and having a generally vertical center axis;

a vapor inlet nozzle extending through said shell for directing a vapor stream into said open internal volume in a generally radial direction;

a distributor within said shell and extending along less than about one-half of an inner circumference of the shell, said distributor comprising a generally upright deflecting surface spaced radially inwardly from the vapor inlet nozzle and a top plate extending between the deflecting surface and the shell to substantially close the top of the distributor, said deflecting surface being shaped and positioned in relation to said vapor inlet nozzle to divide and redirect the vapor stream from said generally radial direction to oppositely directed flow paths about an inner periphery of the column shell; and guide vanes extending inwardly from said shell and circumferentially spaced from the distributor, said guide vanes being positioned in said vapor stream flow paths in spaced relationship from the distributor to redirect at least a portion of said vapor stream toward said center axis from said flow paths about the inner periphery of the column shell to cause a more uniform distribution of the vapor stream across a horizontal cross section of the column.

13. The column as set forth in claim 12, wherein more than one guide vane is positioned within each of said oppositely directed flow paths.

14. The column as set forth in claim 12, wherein the guide vane in one of said oppositely directed flow paths and the guide vane is the other of said oppositely directed flow paths are positioned at an approximately equal distance from said distributor.

15. The column as set forth in claim 12, wherein said guide vanes are generally curved.

16. The column as set forth in claim 12, including a bottom plate extending between the deflecting surface and the shell to substantially close the bottom of the distributor.

17. The column as set forth in claim 12, wherein said distributor extends along less than about one-quarter of the inner circumference of the shell.

18. The column as set forth in claim 12, wherein said guide vanes have a height greater than a corresponding dimension of the deflecting surface.

19. The column as set forth in claim 18, wherein at least one of said guide vanes is spaced from an inner surface of said shell to permit a portion of said vapor stream to flow between the spaced guide vane and the inner surface.

20. The column as set forth in claim 12, wherein said guide vanes are generally planar.

21. The column as set forth in claim 20, wherein said guides vanes are radially aligned.

22. A method for distributing a vapor stream within a mass transfer or heat exchange column having an external shell and a vapor inlet nozzle extending through said shell, said column including a distributor within the external shell of said column and extending along less than about one-half of an inner circumference of the shell, said distributor comprising a generally upright deflecting surface spaced radially inwardly from the vapor inlet nozzle and a top plate extending between the deflecting surface and the shell to substantially close the top of the distributor, said column further including guide vanes extending inwardly from the column shell and circumferentially spaced from the distributor, said method comprising the steps of:

introducing the vapor stream into the distributor through the vapor inlet nozzle and directing the vapor stream against the deflecting surface to divide and redirect the vapor stream to oppositely directed flow paths;

discharging the divided and redirected vapor stream from the distributor about the inner circumference of the shell; and then contacting the discharged vapor stream against the guide vanes to redirect at least a portion of said vapor stream toward a center axis of the column from said flow paths to cause a more uniform distribution of the vapor stream across a horizontal cross section of the column.

23. The method as set forth in claim 22, including contacting the vapor stream against more than one guide vane in each oppositely directed flow path.

24. The method as set forth in claim 22, wherein said distributor extends along less than about one-quarter of the inner circumference of the shell.

* * * * *